United States Patent [19]

Pfefferle

[11] Patent Number: 5,376,345
[45] Date of Patent: Dec. 27, 1994

[54] CATALYTIC METHOD AND APPARATUS

[76] Inventor: William C. Pfefferle, 51 Woodland Dr., Middletown, N.J. 07748

[21] Appl. No.: 920,594

[22] PCT Filed: Sep. 19, 1991

[86] PCT No.: PCT/US91/06830

§ 371 Date: Aug. 26, 1992

§ 102(e) Date: Aug. 26, 1992

Related U.S. Application Data

[63] Continuation-in-part of Ser. No. 273,343, Nov. 18, 1988, Pat. No. 5,051,241.

[51] Int. Cl.$^5$ ............................................. B01D 53/36
[52] U.S. Cl. ............................ 423/213.2; 423/213.5; 423/213.7; 60/300; 422/180; 422/222
[58] Field of Search ............... 422/177, 179, 180, 221, 422/222; 423/212, 213.2, 213.5, 213.7; 60/300

[56] References Cited

U.S. PATENT DOCUMENTS

| | | | |
|---|---|---|---|
| 3,708,982 | 10/1973 | Kitzner | 60/300 |
| 3,797,231 | 3/1974 | McLean | 60/300 |
| 3,910,850 | 10/1975 | Turner | 423/213.5 |
| 4,012,290 | 3/1977 | Olson | 204/1 |
| 4,350,664 | 9/1982 | Gaysent | 422/180 |
| 4,556,543 | 12/1985 | Mochida | 422/180 |
| 4,976,929 | 12/1990 | Cornelison | 422/174 |
| 5,026,273 | 6/1991 | Cornelison | 431/170 |
| 5,146,744 | 9/1992 | Whittenberger | 60/300 |
| 5,170,624 | 12/1992 | Cornelison | 60/300 |
| 5,180,559 | 1/1993 | Ma | 422/180 |
| 5,190,812 | 8/1992 | Cornelison | 60/300 |
| 5,229,080 | 7/1993 | Abe | 60/300 |
| 5,246,672 | 9/1993 | Bak | 422/177 |
| 5,264,186 | 11/1993 | Harada | 422/180 |
| 5,266,279 | 11/1993 | Haerle | 422/177 |
| 5,286,460 | 2/1994 | Abe | 422/177 |

*Primary Examiner*—Peter Chin
*Assistant Examiner*—John Hoffmann
*Attorney, Agent, or Firm*—Kane, Dalsimer, Sullivan, Kurucz, Levy, Eisele and Richard

[57] ABSTRACT

A catalytic reaction system for rapid light-off of hydrocarbon conversion reactions, said reaction system comprising at least one catalyst element of sufficiently low thermal mass to be electrically heatable at the rate of at least 100 degrees Kelvin per second with less than about 50 watts of power per square centimeter of catalyst area perpendicular to the direction of flow.

21 Claims, 2 Drawing Sheets

CATALYTIC METHOD AND APPARATUS

CROSS-REFERENCE TO RELATED CASE

This application is a continuation-in-part of my copending U.S. patent application Ser. No. 273,343 filed Nov. 18, 1988, now issued as U.S. Pat. No. 5,051,241.

BACKGROUND OF THE INVENTION

1. Field of the Invention

This invention relates to improved catalytic reaction systems and to methods for catalytic reaction of carbon containing compounds. In one specific aspect the present invention relates to quick light-off, fast thermal response catalysts for use in catalytic exhaust gas reactors and in catalytic fuel combustion systems.

In one still more specific aspect, this invention relates to low thermal mass electrically conductive catalysts suitable for rapid electrical heating to operating temperature.

2. Brief Description of the Related Art

Automotive emissions are still a major environmental problem in spite of the major advances brought about by the use of catalytic converters. One factor limiting the performance of catalytic converters is that pollution is not controlled during the thirty or so seconds required to bring the converter catalyst to its operating temperature. In present converters, warm-up is dependent on heating of the catalyst by hot engine exhaust gases. Although electrical heating can be utilized to preheat the catalyst prior to engine operation, the power and the time delay required with present catalyst structures, ceramic or metal, have been deemed unacceptable.

The need to reduce catalyst warm-up time of the conventional ceramic monolith automotive catalysts to reduce emissions during the warm-up period has led to increased interest in metal monolith catalysts. However, merely substituting metal for ceramic in a conventional monolith structure yields catalysts which still have much too high a thermal mass. Although metal monoliths are electrically conductive and could therefore be electrically preheated, fast enough heat up times have not yet been demonstrated as feasible with conventional monoliths. Even if sufficient electrical power were made available, thermal shock damage would likely be a problem if a conventional metal monolith were heated as rapidly as needed for elimination of start-up emissions, even with use of a conventional miniature catalyst suitable for only partial conversion of start-up emissions. Thus there is a critical need for a catalyst system which can control hydrocarbon emissions during initial engine operation without the need for heating prior to engine cranking.

For catalytic combustors the problem is not just emissions but the ability to function in certain applications. For example, an automotive catalytic combustor gas turbine must start in roughly the same time frame as present automotive engines.

The present invention provides catalysts and systems which make possible much more rapid warm-up of converter catalysts without electrical heating and near instantaneous electrical heating of catalysts in combustors, catalytic converters and other chemical reaction systems.

SUMMARY OF THE INVENTION

Definitions of Terms

In the present invention the terms "monolith" and "monolith catalyst" refer not only to conventional monolithic structures and catalysts such as employed in conventional catalytic converters but also to any equivalent unitary structure such as an assembly or roll of interlocking sheets or the like.

The terms "low thermal mass catalyst" and "microtherm" used herein refer to a thermally shock resistant catalyst element or structure which can be heated from 300 degrees Kelvin to 800 degrees Kelvin at a rate of at least one hundred degrees Kelvin per second with a power input of less than fifty watts per square centimeter of open area in the plane perpendicular to the direction of flow.

The terms "microlith" and "microlith catalyst" refer to high open area monolith catalyst elements with flow paths so short that reaction rate per unit length per channel is at least fifty percent higher than for the same diameter channel with a fully developed boundary layer in laminar flow, i.e. a flow path of less than about two mm in length, preferably less than one mm or even less than 0.5 mm and having flow channels with a ratio of channel flow length to channel diameter less than about two to one, but preferably less than one to one and more preferably less than about 0.5 to one. Channel diameter is defined as the diameter of the largest circle which will fit within the given flow channel and is preferably less than one mm or more preferably less than 0.5 mm. Microlith catalysts may be in the form of woven wire screens, pressed metal or ceramic wire screens or even pressed thin ceramic plates and have as many as 100 to 1000 or more flow channels per square centimeter. Flow channels may be of any desired shape. For wire screens, flow channel length is the wire diameter and thus advantageously may be shorter than 0.3 mm or even shorter than 0.1 mm.

The terms "carbonaceous compound" and "hydrocarbon" as used in the present invention refer to organic compounds and to gas streams containing fuel values in the form of compounds such as carbon monoxide, organic compounds or partial oxidation products of carbon containing compounds as well as conventional hydrocarbon fuels.

The Invention

It has now been found that use of the microtherm catalysts of the present invention makes possible rugged catalyst systems which can be brought to operating temperature in less than five seconds or even in less than one to two seconds with relatively little power. To achieve such results requires not only that the thermal mass, i.e.; the weight, of the catalytic element be low but also that the geometry be such as to minimize the thermal stresses which result from such extremely rapid heating, i.e.; the flow channel length must be no longer than about three channel diameters to minimize stresses resulting from axial temperature gradients in use.

It has been found that use of the microlith microtherm catalysts of the present invention makes possible as much as a ten fold or more reduction in catalyst mass as compared to that required to achieve the same conversion in mass transfer limited reactions of hydrocarbons using conventional monoliths. It has been found that the specific mass transfer rate increases as the ratio of channel length to channel diameter of a monolith catalyst is reduced below about five to one or more preferably below about two to one and especially below about one to one. Mass transfer of reactants to the surface becomes sensitive to the inlet flow rate rather than being significantly limited by the diffusion rate through a thick laminar flow boundary layer as in conventional monolith catalysts, whether ceramic or metal. In such conventional automotive monolith catalysts, the amount of pollutants oxidized is essentially independent of exhaust gas flow rate and thus percent conversion decreases with increase in flow rate. In contrast, in the microlith catalysts of the present invention, the amount of reactants oxidized typically increases with increase in flow rate. Thus if the inlet flow velocity is high enough, the reaction rate can even approach the intrinsic kinetic reaction rate at the given catalyst temperature without imposing an intolerable pressure drop. This means that it is practical to design microlith fume abatement reactors for much higher conversion levels than is feasible with conventional catalytic converters. Conversion levels of 99.9% or even higher are achievable in a microlith automotive converter smaller in size than a lower conversion level conventional catalytic converter. Conversion levels high enough for abatement of toxic fumes are achievable in compact reactors.

With the short flow paths of catalysts of the present invention, pressure drop is low permitting the use of much smaller channel diameters for a given pressure drop, further reducing catalyst mass required. It has also been found that channel walls as thin as 0.1 mm or even less than 0.03 mm are practical with small channel diameters thus permitting high open areas even with such small channel diameters. Thus, as many as several thousand flow channels per square centimeter or even more are feasible without reducing open area in the direction of flow below sixty percent. Open areas greater than 65, 70 or even 80 percent are feasible even with high channel density microliths.

Inasmuch as heat transfer and mass transfer are functionally related, an increase in mass transfer results in a corresponding increase in heat transfer. Thus, not only is catalyst mass reduced by use of the microlith catalysts of this invention, but the rate at which an automotive exhaust catalyst is heated by the hot engine exhaust is correspondingly enhanced.

Thus microlith catalysts are especially suitable microtherm catalysts in applications requiring the maximum mass transfer rates as in fume abatement applications whereas longer channel length catalysts are required, for example, where structural rigidity is needed. To achieve a given thermal mass per unit length requires lower channel wall thicknesses for smaller channel diameters than for larger ones. Although microliths are often preferred for the electrically heated microtherm elements in automotive or fume abatement applications, large combustor applications, for example, often require larger cell size microtherm elements with flow channel lengths as long as seven to ten millimeters to provide adequate structural rigidity.

If placed sufficiently close to an engine exhaust manifold, the amount of electrical power required to bring a microtherm catalyst system to an effective operating temperature within seconds of cranking is substantially reduced as a result of earlier contact with combustibles. Effective operating temperature for automotive exhaust precious metal catalysts such as platinum and the like are as low as 650 or even as low as 550 degrees Kelvin. However, an important feature of microtherm catalysts is that high enough operating temperatures are achievable prior to or during engine cranking to permit effective use of even deactivated catalysts requiring a catalyst light-off temperature as high as 800 degrees Kelvin or more. Even temperatures high enough for use of base metal catalysts are readily achievable. It has been found that a metal microtherm element composed of a high temperature alloy containing catalytic elements such as chromium, cobalt, copper, manganese, nickel or a rare earth metal can be sufficiently catalytically active for some uses if heated to a temperature of about 800 degrees Kelvin, a temperature readily achieved in less than one second with electrical heating. Many such alloys are commercially available and include Haynes alloy 25, Inconel 600, and even certain stainless steels. With metal microtherms, alloy selection is often determined primarily by oxidation resistance at the maximum operating temperature required by the given application. Such base metal catalysts are especially useful in combustor applications. Fume abatement applications may use either known base metal or precious metal catalysts depending on the compound to be destroyed and the minimum operating temperature required.

The mass of microtherm catalyst elements can be so low that it is feasible to electrically preheat the catalyst to an effective operating temperature in as little as about 0.50 seconds if a thin channel wall electrically conductive catalyst, e.g.; metal microtherm elements are used. In catalytic combustor applications the low thermal mass of catalyst elements of the present invention makes it possible to bring a combustor catalyst up to a light-off temperature as high as 1000 or even 1500 degrees Kelvin in less than about five seconds by electrical heating and even in less than about one or two seconds using the power from a conventional automotive battery. Such rapid heating is allowable for microtherm catalysts because sufficiently short flow paths permit rapid heating without the consequent thermal expansion resulting in destructive stress levels, as for example as a result of leading edge cooling by the inlet gas flow.

In catalytic combustor applications, where unvaporized fuel droplets may be present, flow channel diameter is often large enough to minimize impingement of the largest expected fuel droplet. Therefore in catalytic combustor applications flow channels may be as large as three or four millimeters in diameter whereas in automotive catalytic converter applications, much smaller flow channels are preferred. If desired, one, two or three microtherm catalyst elements may be placed in front of a conventional monolith catalyst element to serve as a light-off reactor for a downstream conventional monolith catalyst.

BRIEF DESCRIPTION OF THE DRAWINGS

The FIG. 1 shows a face view of an electrically conductive microtherm catalyst with electrical leads attached.

DETAILED DESCRIPTION OF THE PREFERRED EMBODIMENTS OF THE INVENTION

Figure 1:
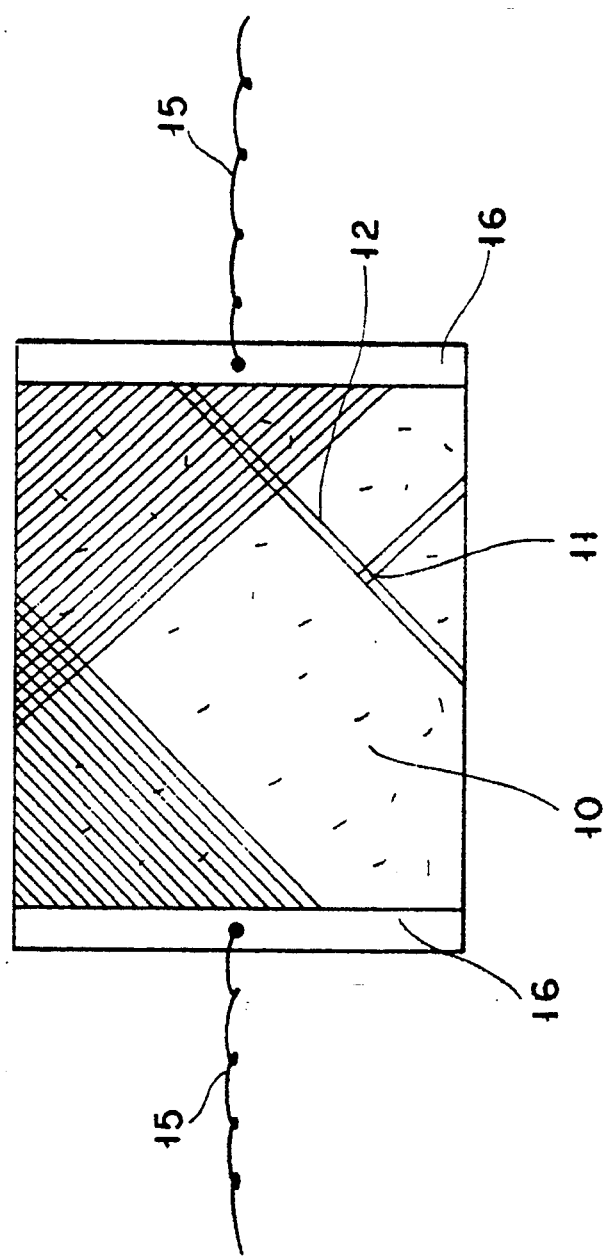

The present invention is further described in connection with the drawing. As shown in the FIG. 1, in one preferred embodiment a microtherm catalyst element 10 comprises a plurality of square flow channels 11 with electrical leads 15 connected to bus bars 16. Bus bars 16 are welded at a forty five degree angle to metallic flow channel walls 12 to ensure even heating of catalyst 10. Advantageously, catalyst element 10 is in the form of a catalytic metal honeycomb like structure with wall thickness thin enough to provide an open area of at least about 60% and more preferably at least about 65 to 70%. Using the power of a standard automotive battery the catalyst may be brought to an effective operating temperature in less than one second, often in significantly less than 0.50 seconds. Thus in automotive exhaust gas service, electrical power need not be applied till just after start of cranking thus limiting maximum drain on the battery. Advantageously, electrical power is applied prior to termination of engine cranking. Typically, an automotive microlith catalyst element is heated to an effective operating temperature within one to two seconds of start of cranking. This rapid heating is important in that no delay in engine starting is required to achieve emissions control. Typical reactors may have from one to ten or more such microliths.

The microtherm catalysts of the present invention are readily made using known catalytic agents. The following examples describe means of making microtherm catalysts but are not to be construed as limiting. A microtherm catalyst as per the drawing may be made by vacuum sputtering a catalyst such as platinum onto a stainless steel microtherm honeycomb which has been cleaned by heating in air to 750 degrees Kelvin. Typically the platinum coating may be from 5 to 100 angstroms in thickness but may be thicker for greater catalyst life. Advantageously, a similarly thin layer of ceria or alumina may be deposited on the substrate prior to deposition of the platinum. Catalysts containing palladium, iridium, rhodium or other metals can be similarly prepared. In many applications, especially for higher catalyst operating temperatures, a microtherm element formed from stainless steel or other alloy is a sufficiently active catalyst without additional coating. Although metal microtherms are preferred, microtherms of electrically conductive ceramics can be made by slicing of ceramic honeycomb extrudates prior to firing. Such ceramic honeycomb extrudates advantageously may contain an organic binder to facilitate production of thin slices. As necessary for sufficient low temperature catalytic activity, ceramic and metal microtherm elements may be made catalytic using various techniques well known in the art.

EXAMPLE 1

Figure 2:
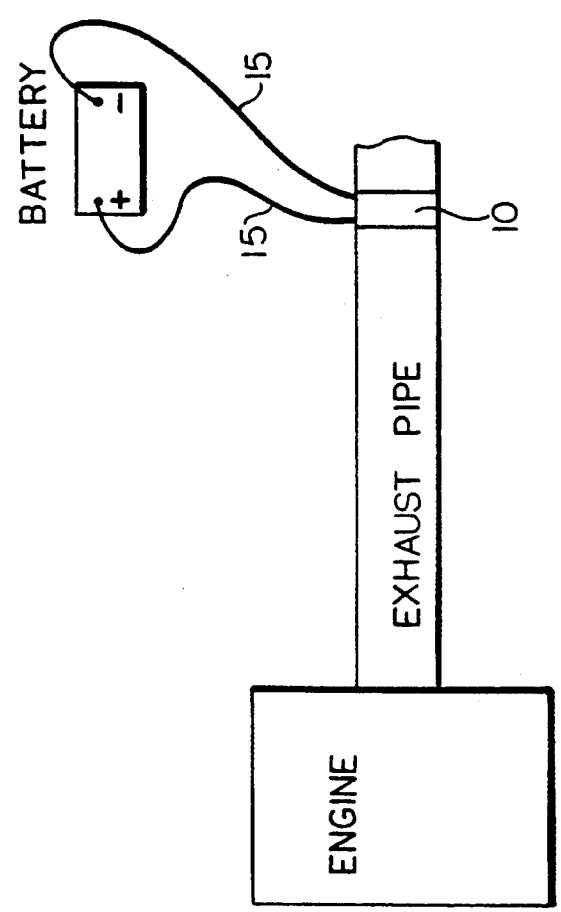
FIG. 2 is a block diagram showing a system for hydrocarbon conversions incorporating the microtherm catalyst of FIG. 1.

A three element catalytic microlith automotive exhaust reactor having about 2500 flow channels per square centimeter is constructed using a five centimeter wide strip of 70% open area screening of platinum coated stainless steel wires having a diameter of 0.03 mm spaced 0.20 mm apart and installed in the exhaust pipe of a four cylinder automotive engine as a means of directing a hydrocarbon flow to the catalyst see FIG. 2. During engine cranking electrical power from the battery is applied heating the microlith catalyst elements to a temperature of 700 degrees Kelvin within one second whereby hydrocarbon emissions are controlled during initial operation of the engine.

EXAMPLE II

An electrically heated two element microtherm catalytic combustor is constructed using microtherm catalytic elements four millimeters in length with hexagonal channels 1.5 millimeters in diameter. The microtherm elements are electrically heated to 900 degrees Kelvin within three seconds and an intimate mixture of fuel and air is formed by spraying jet fuel into the air passing into the reactor. Plug flow gas phase combustion of the fuel is achieved. Advantageously, an electronic temperature controller is used to limit the catalyst temperature during electrical heating and to assure maintaining an effective temperature in the event of a fuel interruption of other flow upset. A controller with anticipatory capabilities is preferred.

EXAMPLE III

A fume abatement reactor six centimeters in length is constructed using 300 microlith elements of screening with about thirty 0.050 mm wires of platinum coated nichrome per centimeter (nominally 900 flow channels per square centimeter). Fumes containing 50 ppm by volume of benzene in air are preheated to 700 degrees Kelvin and passed through the microlith reactor. Better than 99.9 percent conversion of the benzene is achieved.

What is claimed is:

1. A catalytic reaction system for rapid light-off of hydrocarbon conversion reactions, which comprises;
    a microlith catalyst element having a plurality of open flow channels, each with
        a channel flow diameter of less than about 1.5 mm;
        and a channel flow length no longer than about 3 channel diameters;
    said element having sufficiently low thermal mass to be electrically heatable at the rate of at least 100 degrees Kelvin per second as measured within a temperature range of 300 to 1000 degrees Kelvin, using a power of less than about 50 watts per square centimeter of catalyst element area perpendicular to the direction of hydrocarbon flow; and
    means to electrically heat said catalyst element from ambient temperature to a temperature within the range of from 550° K. to 1500° K. within 5 seconds time of applying the means, connected electrically to the microlith catalyst element.

2. The system of claim 1 wherein said power is less than about 25 watts per square centimeter of said area perpendicular to the direction of flow.

3. The system of claim 1 wherein the time to heat to said temperature is less than about three seconds.

4. The system of claim 3 wherein said temperature is greater than 800 degrees.

5. The system of claim 1 in which the open channels of said catalyst element is greater than about 65 percent of the element area transverse to the direction of hydrocarbon flow.

6. The system of claim 1 wherein said catalyst element comprises an electrically conductive ceramic.

7. The system of claim 1 wherein said catalyst comprises a metal catalyst.

8. The system of claim 1 in which the number density of said flow channels is greater than 100 channels per square centimeter.

9. The system of claim 8 in which the number density of said flow channels is greater than 1000 channels per square centimeter.

10. The system of claim 1 wherein the mass of said catalyst element is sufficiently low such that said catalyst element can be electrically heated to a temperature of at least 1000 degrees Kelvin within about one second using an automotive battery.

11. The system of claim 10 wherein the mass of said electrically conductive catalyst element is sufficiently low such that said catalyst element can be heated to a temperature of at least 1000 degrees Kelvin within about 0.50 seconds.

12. A catalytic reaction system of claim 1 wherein the flow channel diameter is less than 1 mm.

13. A catalytic reaction system of claim 1 wherein the flow channel diameter is less than 0.5 mm.

14. A catalytic reaction system of claim 1 wherein the flow channel length is shorter than 0.3 mm.

15. A catalytic reaction system of claim 1 wherein the flow channel length is shorter than 0.1 mm.

16. The method of controlling combustion exhaust emissions from internal combustion engines during initial engine operation, which comprises;
    a. providing a microlith catalyst element having a plurality of open flow channels; each with
        a channel flow diameter of less than about 1.5 mm;
        and a channel flow length no longer than about 3 channel flow diameters;
        said element having a sufficiently low thermal mass to be electrically heatable at the rate of at least 100 degrees Kelvin per second as measured within a temperature range of 300 to 800 degrees Kelvin, using less than about 50 watts of power per square centimeter of catalyst element area perpendicular to the direction of channel flow;
    b. starting the engine,
    c. electrically heating the catalyst element to an effective catalyst operating temperature within three seconds of starting the engine; and
    d. passing the exhaust emissions through said catalyst element flow channels.

17. The method of claim 16 wherein said catalyst element reaches catalyst operating temperature within one second of starting the engine.

18. The method of claim 16 wherein the channel flow diameter is less than 1 mm.

19. The method of claim 16 wherein the channel flow diameter is less than 0.5 mm.

20. The method of claim 16 wherein the flow channel length is shorter than 0.3 mm.

21. The method of claim 16 wherein the flow channel length is shorter than 0.1 mm.

* * * * *